United States Patent [19]
Wu

[11] Patent Number: 5,575,178
[45] Date of Patent: Nov. 19, 1996

[54] BRAKE HANDLE

[76] Inventor: Chin-chang Wu, No. 19, Lane 108, Yungfeng Rd., Taiping Hsiang, Taichung Hsien, Taiwan

[21] Appl. No.: 517,916

[22] Filed: Aug. 22, 1995

[51] Int. Cl.$^6$ ............................... F16C 1/10; G05G 1/10
[52] U.S. Cl. ............................ 74/489; 74/502.2; 74/506
[58] Field of Search ........................... 74/489, 502.2, 74/506, 526

[56] References Cited

U.S. PATENT DOCUMENTS

| | | | |
|---|---|---|---|
| 4,840,081 | 6/1989 | Nagano | 74/502.2 |
| 4,909,094 | 3/1990 | Yoshigai | 74/489 |
| 5,448,927 | 9/1995 | Lumpkin | 74/502.2 |

*Primary Examiner*—Charles A. Marmor
*Assistant Examiner*—Troy Grabow
*Attorney, Agent, or Firm*—Testa, Hurwitz & Thibeault, LLP

[57] ABSTRACT

A brake handle includes a brake body, a brake lever and a rotatable disk. Wherein a semi-circular slot is positioned within the brake body and the brake lever, respectively. The rotatable disk is disposed between the brake body and brake lever. Wherein the rotatable disk can be partially inserted into the slot of the brake body and can be further partially inserted into the slot of the brake lever so the brake body and the brake lever can be pivotally locked to each other. The rotatable disk comprises a groove defined in a periphery of the rotatable for receiving a brake cable and an opening defined in one side of the rotatable disk for receiving a brake cable nipple. The brake cable is connected to the brake via the brake body.

6 Claims, 3 Drawing Sheets

BRAKE HANDLE

FIELD OF THE INVENTION

This invention relates to a brake handle, and more particularly, to a brake handle with a rotatable disk.

THE BACKGROUND OF THE INVENTION

A bicycle is considered to be the most universal form of transport throughout the world. A brake handle is the important structural component of a bicycle. FIG. 3, is a plan view showing a use of the prior art brake handle wherein a brake body 50 is mounted to a handlebar 60. A brake lever 51 is mounted to a middle portion of the brake body 50. The brake lever 51 provides a caulking groove 511 adjacent to the brake body 50 for receiving a brake cable nipple 521. A brake cable 52 is connected to a brake of a bicycle via the upper portion of the brake body 50. However, there are several disadvantages of this design. When the brake handle is in use, the brake lever 51 must be moved inwardly by a hand directly, so the force applied to the brake lever 51 must be large enough to move the brake lever 51. Furthermore, as the brake lever is moved, a brake cable accordingly pulled thereby moves out of alignment with a passage defined in the brake body 50 thereby creating friction as the cable rubs acutely against a periphery defining the passage.

Another disadvantage which pertains to the brake handle is that there is a distance between the brake lever 51 and the handlebar 60 for pressing inwardly the brake lever 51, so in fact, it is dangerous for some people whose hands are so small the brake lever 51 cannot be held completely.

BRIEF SUMMARY OF THE INVENTION

In accordance with a preferred embodiment of the present invention, there is provided a brake handle which is composed of a brake body, a brake lever and rotatable disk. Wherein a semi-circular slot is defined within the brake body and the brake lever, respectively. The rotatable disk is disposed between the brake body and brake lever. Wherein the rotatable disk can be partially inserted into the slot of the brake body and the rotatable disk can be further partially inserted into the slot of the brake lever and so the brake body and brake lever can be locked together. The rotatable disk comprises an annular groove defined in a periphery thereof for receiving a brake cable, and an opening defined in one side thereof for receiving a brake cable nipple. The brake cable is connected to the brake via the brake body. Whereby, the farce which is applied to the brake lever is transferred via the rotatable disk to act on the brake cable in such a manner that the rotation force from the cable 40 is in line with the passage 12 and tangent to the disk 30.

Another object and advantage of the present invention is to provide a brake handle, wherein a set screw is threadedly engaged at a top end of the brake lever via a hole defined therein. The set screw projects from the brake lever for adjusting the distance between the handlebar and the brake lever so as to be suitable for any sizes of hands.

The details of the present invention are set out in the following description and drawings wherein like reference characters depict like elements.

BRIEF DESCRIPTION OF THE INVENTION

DESCRIPTION OF THE PREFERRED EMBODIMENT

Figure 1:
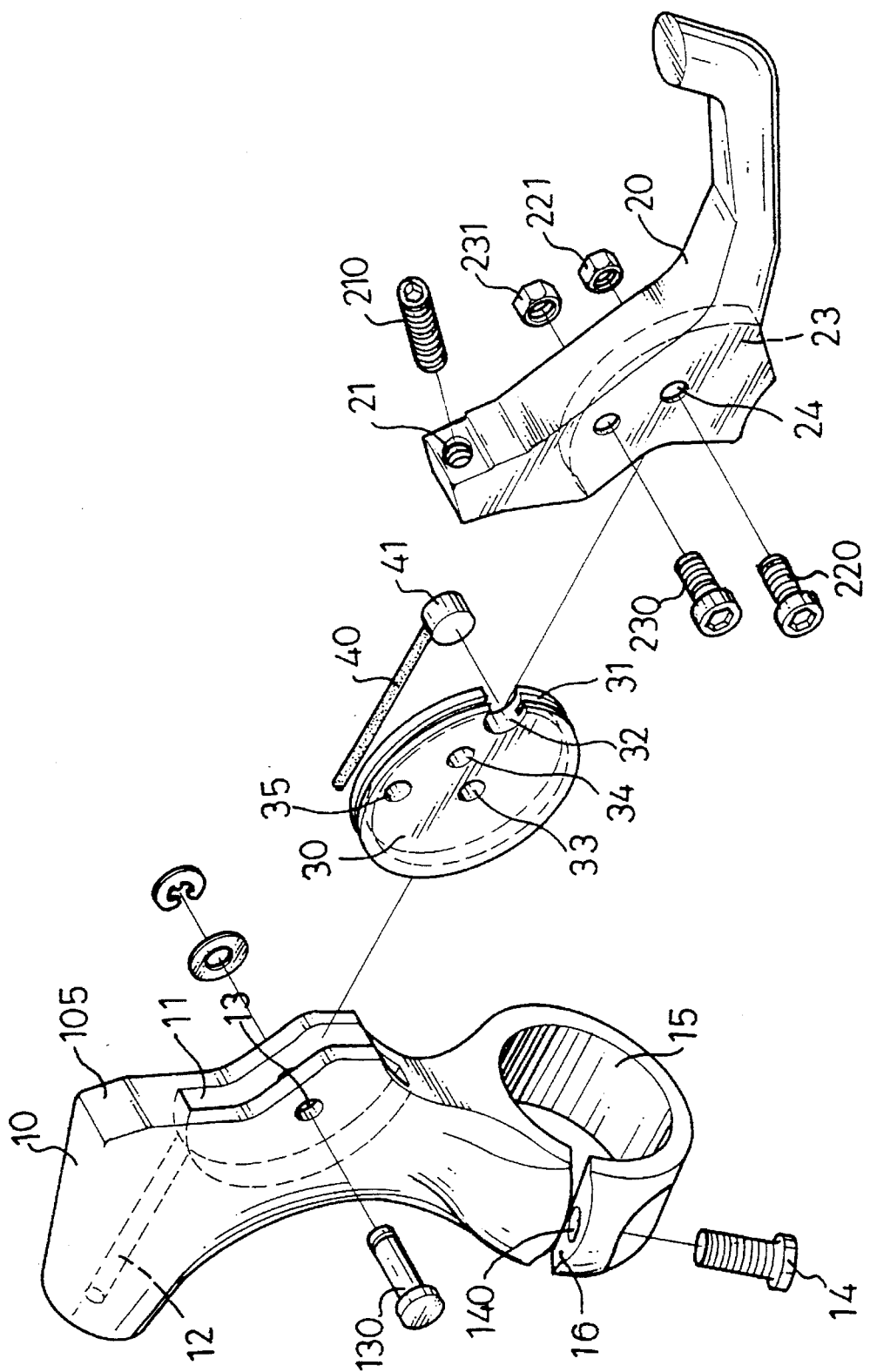
FIG. 1 is an exploded view of a brake handle in accordance with the present invention.

Referring now to the drawings wherein the descriptions are for purposes of illustration a preferred embodiment of the present invention only, and not for purposes of limiting the same. FIG. 1 perspectively illustrates an exploded view of a brake handle. The brake handle of the present invention generally comprises a brake body 10, a brake lever 20 and a rotatable disk 30 which receives a brake cable 40. The brake body comprises an upper portion, a central portion and a lower portion, none of which are numbered. Wherein a semi-circular slot 11 is provided in the center portion of one side of the brake body 10 for receiving one side of the rotatable disk 30. A hole 13 communicates with the slot 11 and extends through both sides of the brake body 10 defining the slot 11. An inner hole 15 is substantially positioned in the lower end of the brake body 10 for receiving a handlebar of a bicycle. Wherein a peripheral edge defining the inner hole 15 is slit transversely to define a recess 16 and a hole 140 defined by a threaded periphery is obliquely positioned thereof upwardly in which a bolt 14 is threadedly received to securely retain the brake body 10 to the handlebar. A passage 12 in communication with the semi-circular slot 11 extends longitudinally through the upper portion of the brake body. The brake cable 40 extends from a brake stirrup (not shown) of a bicycle through the passage 12.

The brake lever 20 is substantially received adjacent to the slot 11 of the brake body 10 and has a semicircular slot 23 defined in one side thereof, said brake lever 20 having a plurality of through holes 24, 25 along a radial direction on both sides defining the semicircular slot 23. Additionally, a hole 21 defined by a threaded periphery is disposed in the top of the brake lever 20.

The rotatable disk 30 has a bore 33 defined through a center thereof and a plurality of through holes 35, relative to the through holes 22, 24 of the brake lever 20. Additionally, the rotatable disk 30 further comprises an annular groove 31 defined in a periphery of the rotatable disk 30 for receiving the brake cable 40 extending through the passage 12 and an opening 32 recessed in the rotatable disk 30 for receiving a brake cable nipple 41 thereof.

Figure 2:
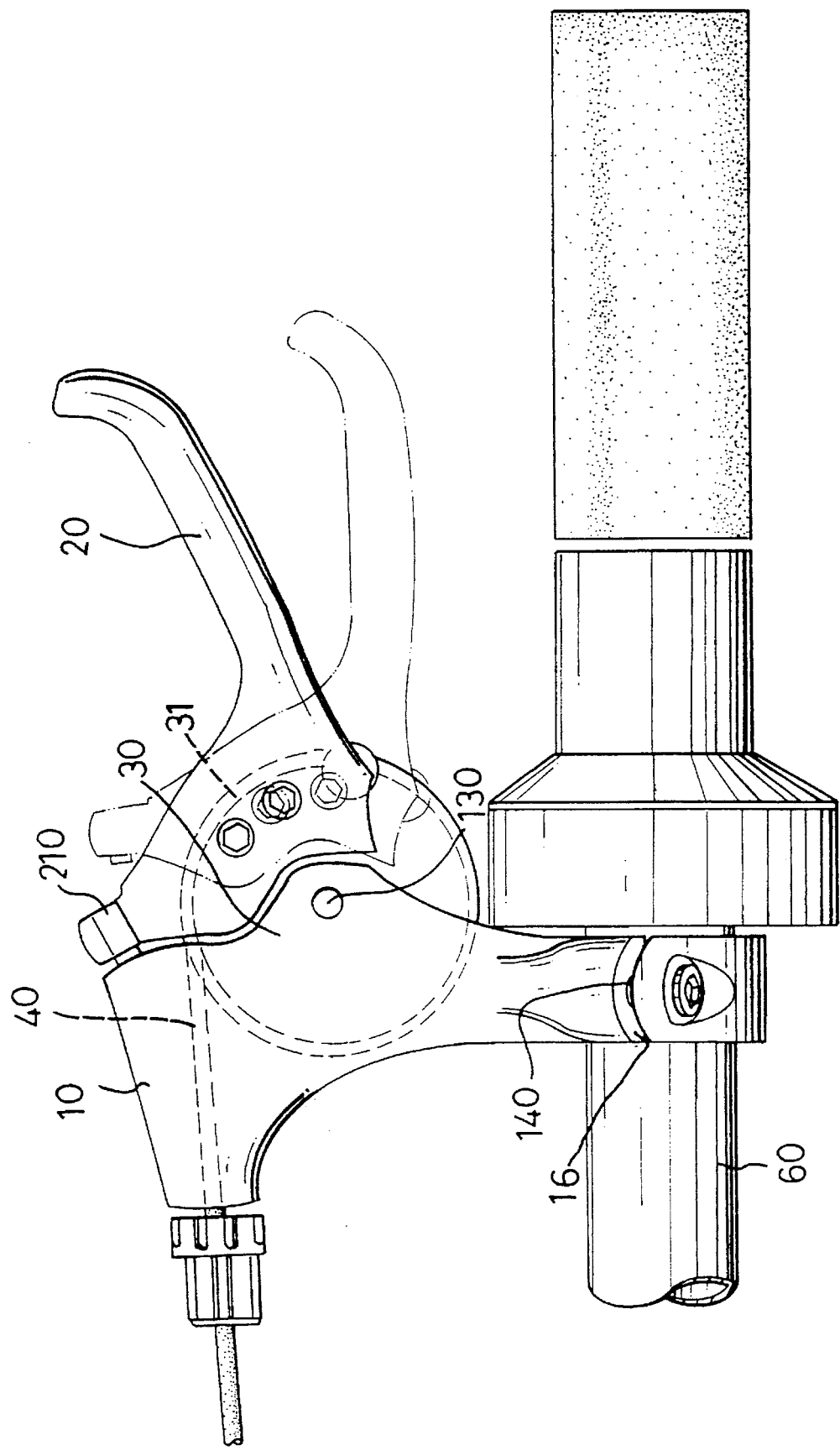
FIG. 2 is an assembled view showing a use of the brake handle in accordance with the present invention.
Figure 3:
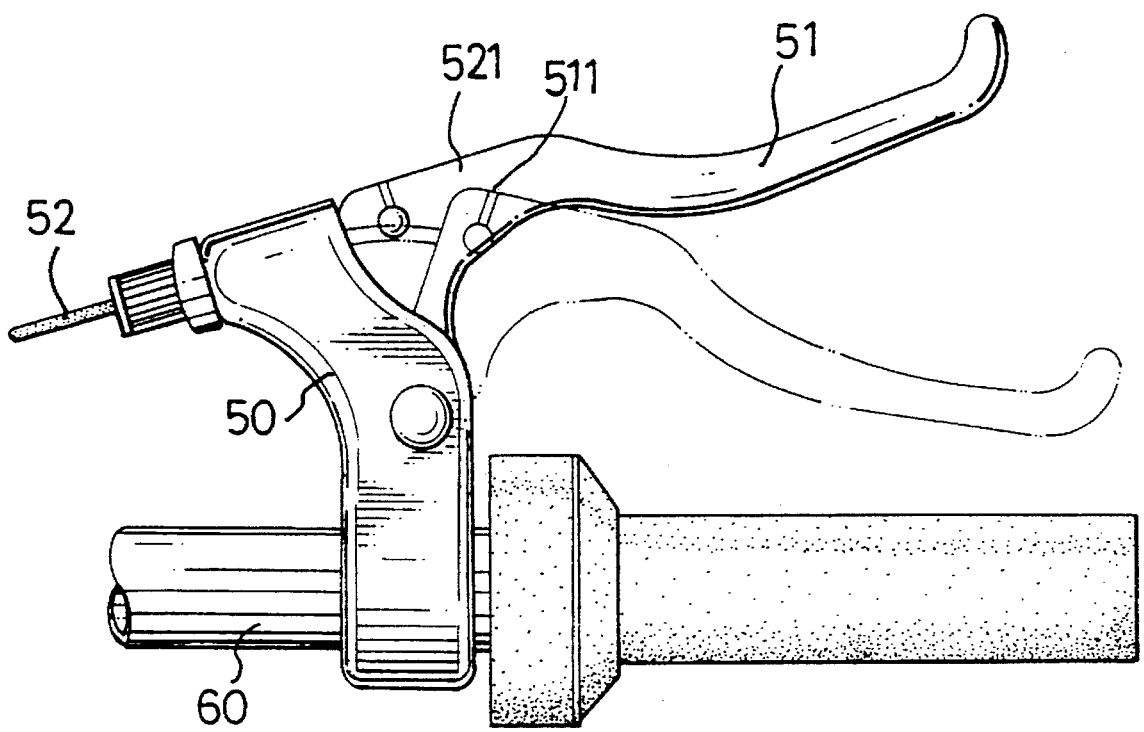
FIG. 3 is a plan view showing a use of the prior art brake handle.

In assembly, as shown in FIG. 1 and FIG. 2, the rotatable disk 30 is partially and securely received in the semi-circular slot 11 of the brake body 10 by a connector pin 130 fastening through the corresponding hole 13 and bore 33 of the brake body 10 and the rotatable disk 30 respectively. The connector pin 130 is engaged in a C-shaped snap ring (not numbered) for fastening the connector pin 130 to the brake body 10. The rotatable disk 30 is further partially and securely received in the semicircular slot 23 of the brake lever 20 by a first screw bolt 220 threadedly engaged with a nut 221 via the corresponding holes 34 and 24 of the rotatable disk 30 and the brake lever 20. A second screw bolt 230 extends through holes 25 and 35 of the brake lever 20 and rotatable disk 30 respectively, and engages with a nut 231.

Referring to FIG. 1 and FIG. 2, when the present invention is in use, a portion of the handlebar 60 can be inserted into the inner hole 15 of the brake body 10, then a screw bolt 14 is threadedly engaged with the hole 140 defined in one side of the brake body 10. The distance between the recess 16 is reduced by force of the screw bolt 14 so that the brake body 10 is securely connected to the handlebar 60.

Referring to FIG. 2, when the brake lever 20 is subjected to a inward pressure, the rotatable disk 30 which is mounted on the brake body 10 rotates like a pulley, the brake cable 40 is rolled around the groove 31 of the rotatable disk 30 and the travel path of the cable remains well-aligned with the passage 12. Whereby, the force which is applied to the brake lever 20 is transferred via the rotatable disk 30 to act on the brake cable in such a manner that the rotation force from the cable 40 is in line with the passage 12 and tangent to the disk 30.

Additionally, a set screw 210 is threadedly engaged with the hole 21 defined by a threaded periphery located at a top end of the brake lever 20. The set screw 210 projects from the brake lever 20 to contact a portion 105 of the body 10 for adjusting the distance between the handlebar 60 and the brake lever 20 so as to be suitable for any sizes of hands.

Those skilled in the art will recognize that variations and modifications may be made without departing from the true spirit and scope of the invention. The invention is therefore not to be limited to the illustrations and descriptions set forth but is to be determined by the appended claims.

What the invention claimed is:

1. A brake handle for attachment to a bicycle, the brake handle comprising:

a brake body defining a semi-circular slot therein;

a brake lever defining a semi-circular slot therein; and a rotatable disk partly and rotatably received in the semi-circular slot of the brake body and partly and fixedly received in the semi-circular slot of the brake lever, the rotatable disk including securing means for receiving a brake cable, and an engaging means for the brake lever to be releasably engaged to the disk.

2. A brake handle in accordance with claim 1, wherein:

the securing means for receiving the brake cable comprises an opening defined near a periphery thereof to receive a nipple formed at one end of the brake cable.

3. A brake handle in accordance with claim 1, wherein:

the engaging means for the brake lever to be engaged to the rotatable disk comprises a plurality of holes defined through the rotatable disk, a corresponding plurality of holes defined through the brake lever and a corresponding plurality of fasteners.

4. A brake handle in accordance with claim 1, wherein:

the brake body defines a longitudinal passage in communication with the semi-circular slot thereof and through which the brake cable can extend in constant alignment therewith.

5. A brake handle in accordance with claim 1, wherein:

the rotatable disk has a groove defined in a periphery thereof to receive the brake cable.

6. A brake handle in accordance with claim 1, further comprising a hole defined by a threaded periphery in an upper portion of the brake lever and an adjusting screw threadedly received by the hole, and wherein a tip of the adjusting screw abuts against the brake body.

* * * * *